Dec. 12, 1961  J. SZERSZYNSKI  3,012,278
MACHINES FOR VULCANIZING OUTSOLES ONTO SHOE BOTTOMS
Filed May 18, 1959  3 Sheets-Sheet 3

United States Patent Office 3,012,278
Patented Dec. 12, 1961

3,012,278
MACHINES FOR VULCANIZING OUTSOLES ONTO SHOE BOTTOMS
Janusz Szerszynski, Leicester, England, assignor to United Shoe Machinery Corporation, Flemington, N.J., a corporation of New Jersey
Filed May 18, 1959, Ser. No. 814,066
Claims priority, application Great Britain June 14, 1958
1 Claim. (Cl. 18—17)

This invention relates to molding machines and is herein illustrated in its application to machines for molding and attaching outsoles to shoe bottoms and curing or vulcanizing the outsole substances. It is to be understood, however, that the invention is not limited to machines which perform both a molding and a curing operation, but is applicable to machines for molding and attaching outsoles which do not require a curing or vulcanizing operation, for example, outsoles made of substances which set upon dissipation of heat therefrom.

Machines for molding and vulcanizing soles of dense rubber onto shoe bottoms are well known in the shoe manufacturing trade. A machine of this type is disclosed, for example, in United States Letters Patent No. 2,922,191, granted January 26, 1960, on an application filed in the name of George C. Barton. Machines of this type are provided with a shoe form for supporting a lasted shoe preparatory to the molding and vulcanizing of an outsole thereto. For molding the sole a suitable organization of mold elements is provided comprising a bottom mold member, and a pair of side mold members carrying crease plates which engage the upper in the region of the insole line to close the mold cavity. A charge of unvulcanized rubber is inserted into the mold cavity before the shoe form is advanced into the molding station. The bottom mold member and the side mold members are suitably heated in order to bring the charge to its vulcanizing temperature.

Attempts to vulcanize microcellular rubber soles onto bottoms of lasted shoes using the same procedure as that employed in vulcanizing soles of dense rubber have not produced commercially acceptable footwear because of a distortion of the sole which occurs when the pressure of the mold elements is relieved and the shoe is removed from the machine. This distortion appears to be due to the expansion of gas in the sole substance, such expansion causing the sole to expand widthwise and lengthwise of the shoe as well as heightwise thereof.

With a view to obviating such distortion of the sole it has been proposed to employ a method of vulcanizing microcellular rubber soles onto the bottoms of lasted shoes which consists in placing a lasted shoe on a shoe form as above described, inserting into the mold cavity a suitable charge having a blowing agent incorporated therein, applying heat and pressure to the charge to cause it to flow and fill the mold cavity and to initiate the action of the blowing agent while partially vulcanizing the charge, moving the bottom mold member away from the shoe bottom to a measured extent and at a predetermined rate of speed to a predetermined position, thus to permit the charge to expand under the action of the blowing agent at a controlled rate heightwise only of the shoe and then holding the bottom mold member in said predetermined position until the period of vulcanization has elapsed.

It is an object of the present invention to provide a machine of the type above described having means for effecting movements of the bottom mold member required for the molding and vulcanizing of microcellular rubber soles onto the bottoms of lasted shoes by the method above described.

It is a further object of the invention to provide a machine of this type which is operable to vulcanize microcellular rubber soles onto the bottoms of the lasted shoes by the method above described, but which may be readily adjusted to operate in a manner suitable for vulcanizing soles of dense rubber onto shoe bottoms.

With these and other objects in view, as will hereinafter appear, the present invention contemplates the provision in a molding machine having a low pressure system whereby relatively light pressure is applied to the mold piston during an initial stage of the molding cycle and a high pressure system whereby relatively heavy pressure is applied to the piston during the remaining portion of the cycle, of a chronometer operated valve which controls the flow of pressure fluid from a source of low fluid pressure and from a source of high fluid pressure. The machine is provided with an exhaust system affording the retraction of the mold piston incidental to the molding of microcellular soles. During the operation of the machine to mold dense rubber soles said exhaust system is closed by a suitable shut-off valve. For opening the shut-off valve a secondary control system is provided. This system includes a manually operated gate valve in a high pressure line for shifting a selector valve whereby the shut-off valve is controlled. For controlling the expansion of microcellular soles during the molding thereof the retracting movement of the bottom mold member is controlled by a governor valve on the down stream side of the shut-off valve.

The invention will now be described with reference to the accompanying drawings and pointed out in the appended claim.

In the drawings.

Figure 1:
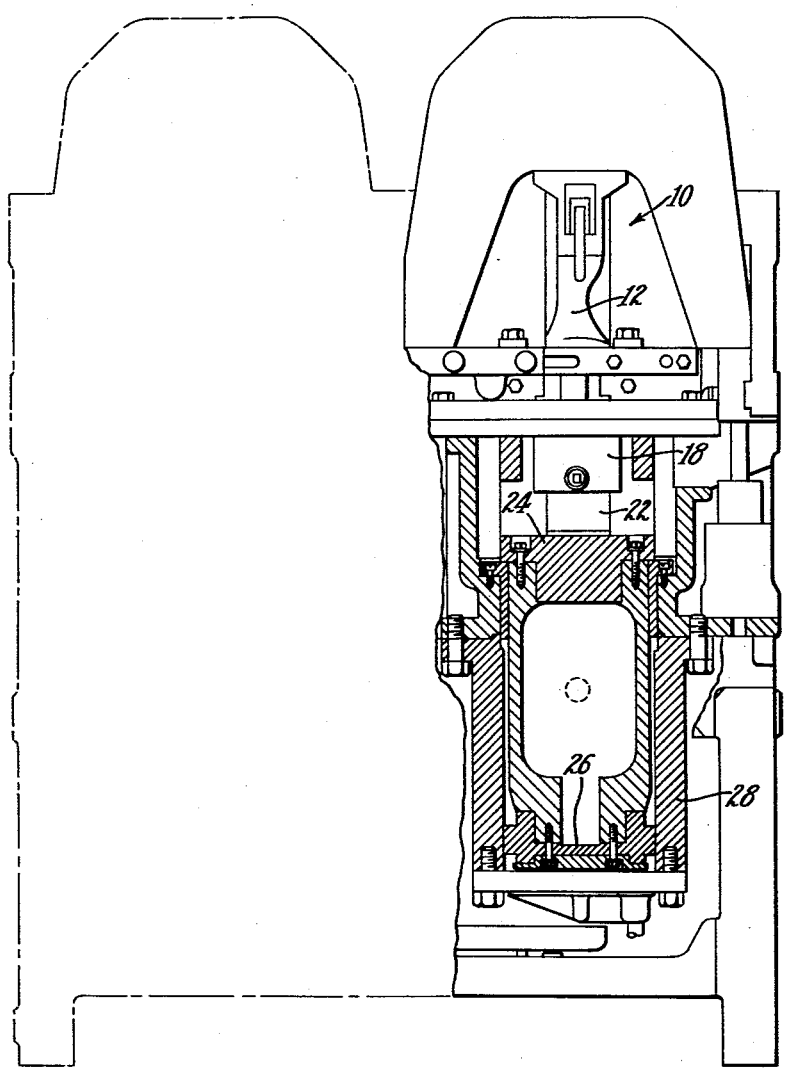
FIG. 1 is a front elevation, partly diagrammatic of a machine embodying the features of the present invention, certain parts being broken away and other parts being shown in section.
Figure 2:
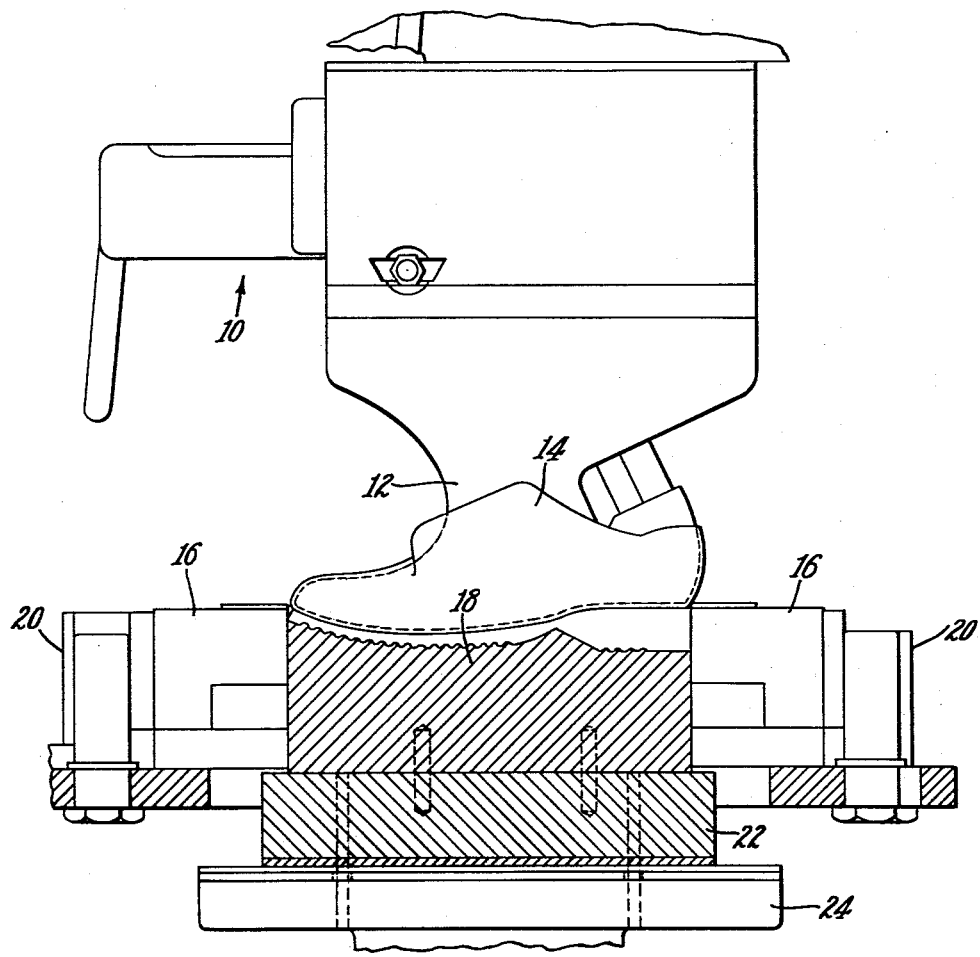
FIG. 2 is a right side elevation partly in section showing the shoe form and the molding assembly with the molds in their advanced position.

The invention is illustrated as embodied in a machine generally similar to that illustrated and described in the patent hereinbefore referred to. This is a two station machine having in each station a carier 10 for a shoe form 12 on which there is mounted a shoe comprising an upper 14 (FIG. 2) lasted to an insole (not shown). The carrier is operable between a rest position (not shown) in which it is arranged to receive a shoe and an advanced position illustrated in FIG. 2 in which it is located in the mold station. The mold elements comprise inner and outer side mold members one of which is illustrated in FIG. 2 and identified by the numeral 16 and a bottom mold member 18. The side mold members are mounted in heated carriages 20 and the sole mold member is mounted on a heated plate 22 which, in turn, is mounted on a head 24 fixed to the upper extremity of a piston 26 (FIG. 1) which applies upward pressure to the bottom mold member. Suitable power operated means (not shown) is provided for advancing the side mold members into mold closing position. The construction and operation of the shoe supporting assembly and the side molds and their operating means will not be further described herein.

The piston 26 is mounted for vertical sliding movement in a cylinder 28 (FIGS. 1 and 3), a similar piston and cylinder organizations (not shown) being provided in the other station of the machine. For actuating the piston the illustrated machine is provided with a hydraulic organization comprising a pump 30 which delivers fluid under relatively low pressure and a second pump 32 which delivers fluid under relatively high pressure. The two pumps are connected, respectively, by pipes 34 and 36 to a selector valve 38 which is controlled by a chronometer 40. The selector valve is connected to a pipe 42 which communicates with a valve 44 which in turn communicates through a pipe 46 with one port of a pilot operated selector valve 48. The valve 48 has a valve body which is normally biased by a spring 50 into its position indicated in FIG. 3 in which the pipe 46 communicates with a pipe 52 which, in turn, communicates through a check valve 54 and a pipe 56 with a pipe 58 communicating with a port 60 in the lower portion of the cylinder 28. Downward flow of fluid through the pipe 58 is prevented by a normally closed valve 62 during the advancement or pressure stroke of the piston 26.

The upper portion of the cylinder 28 communicates with an exhaust line 64 which is connected to a spring-loaded valve 66, the outlet port of said valve being connected to a sump. The pump 30 is connected, through a pipe 68 and a pressure reducing valve 70, to a port 72 in the upper portion of the cylinder 28. The valve 66 is set to open at a pressure only slightly in excess of the pressure of fluid flowing from the valve 70 into the port 72, and preferably the valve 70 is adjusted for the flow of fluid at a comparatively low pressure, for example about 50 p.s.i. Thus, it will be seen that fluid flowing from the valve 70 is restrained by the valve 66 from flowing to the sump.

Figure 3:
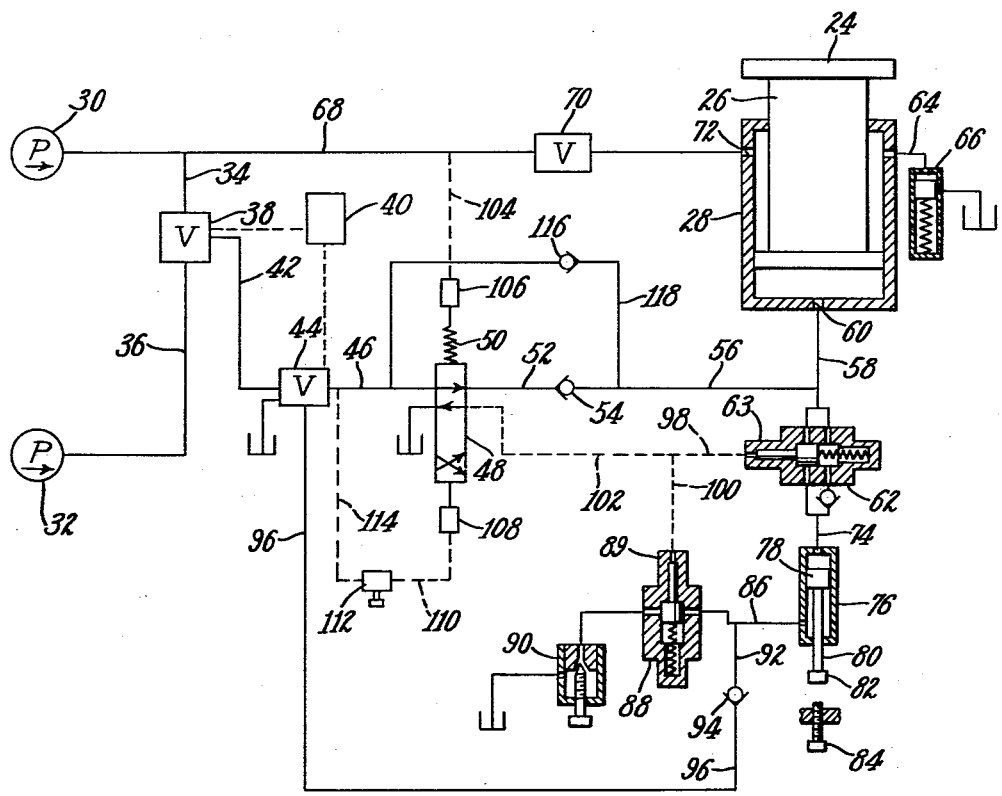
FIG. 3 is a hydraulic chart.

In its open position, to which it is shifted by the operation of a pilot 63, the valve 62 communicates through a pipe 74 with a governing means comprising a piston 78 operating in a cylinder 76. The piston carries a rod 80 which extends downwardly from the lower extremity of the cylinder 76 and carries at its lower end a head 82 which is arranged to engage a stop screw 84 to arrest the downward movement of the piston 78. Fluid in the lower portion of the cylinder 76 flows through an exhaust line 86, a valve 88 and a needle valve 90 to the sump. The valve 88 is normally closed but is opened at the appropriate time by a pilot 89 which communicates with a pilot pressure line 100. The line 100 and the pilot pressure line 98 to the pilot 63 are connected together and communicate through a pipe 102 with a port of the selector valve 48, which port, in the normal position of said valve illustrated in FIG. 3, is connected to the sump but is connected to heavy pressure from the pump 32 upon the operation of the selector valve 48 by a pilot 108. The operation of the pilot 108 is controlled by a manually operated gate valve 112 connecting sections 110 and 114 of a pilot line from the pipe 46 to the pilot 108. A secondary hydraulic circuit is provided for shifting the valve 48 into its position in FIG. 3, said secondary circuit including a pilot line 104 extending from the low pressure line 68 to a pilot 106 of the valve 48.

When the gate valve 112 is closed the machine will operate in a manner suitable for vulcanizing soles of dense rubber, the hydraulic circuit then being set for an operation now to be described. Assuming that the foot forms have been advanced into their respective molding stations and the side mold members have been brought into contiguous relation to each other and that the selector valve 38 has been operated to provide an open circuit from the pump 30 to the pipe 42, the cylinder 28 receives fluid under relatively low pressure through the valve 44, the pipe 46, the selector valve 48, the pipe 52, the check valve 54, the pipe 56 and the pipe 58. The valve 62 being closed, the piston 26 is raised, fluid above the piston being exhausted to the sump through the pressure loaded valve 66. The low pressure on the piston is maintained for a period determined by the setting of the chronometer 40. After the expiration of this period the chronometer 40 operates the selector valve 38 to close the line 34 to the pump 30 and to open the pipe 36 to the high pressure pump 32 thereby to cause the application of high pressure to the charge in the mold cavity thus to complete the molding and the vulcanizing of the sole. After the completion of the vulcanizing cycle the chronometer 40 causes the operation of the valve 44 to close the port communicating with the pipe 42 and to open a port in the valve 44 communicating with the sump whereupon fluid in the lower portion of the cylinder 28 is exhausted through the pipes 58 and 56, a by-pass line 118, a check valve 116, and the pipe 46 to the valve 44 and thence to the sump. Fluid from the low pressure pump 30 flows through the pipe 68 and the reduction valve 70 to the upper portion of the cylinder 28 to move the piston 24 downwardly thus to retract the bottom mold member 18. The side mold members are retracted and the shoe form is returned to its loading station by mechanism illustrated and described in the application for United States Letters Patent hereinbefore referred to but not shown herein.

When the machine is to be employed in vulcanizing a sole of microcellular rubber onto a shoe bottom the gate valve 112 is open and the hydraulic cycle is as follows. The piston 78 of the governing means is in its elevated position shown in FIG. 3 to which it was brought in the preceding cycle of the machine by pressure fluid flowing through the pipe 96 and the check valve 94. The shoe form having been advanced into the molding station and the side mold members having been closed, pressure fluid flows from the low pressure pump 30 through the pipe 34, the selector valve 38, the pipe 42, the valve 44, the pipe 46 and the valve 48 which will be held in its position illustrated in FIG. 3 by the spring 50 since both of the pilots 106 and 108 are under low pressure from the pump 30, the former through the pilot pressure line 104 and latter through the gate valve 112 and the pilot pressure line 110. From the valve 48 low pressure fluid from the pump 30 flows through the pipe 52, the check valve 54 and the pipes 56 and 58 to the lower port 60 of the cylinder 28 thereby operating the piston 26 to raise the bottom mold member 18 thus to apply low pressure to the charge in the mold cavity. At the termination of a period of time measured by the chronometer 40 said chronometer operates the selector valve 38 to connect the high pressure pump 32 to the pipe 42 and through the valve 44, the pilot pressure line 114 and the gate valve 112 to the pilot pressure line 110 communicating with the pilot 108 of the selector valve 48. Inasmuch as the pilot 106 is still connected to the low pressure pump 30 the valve 48 is shifted against the action of the spring 50 and the pilot 106 to cut off the flow of oil into the pipe 52 and to connect said pipe to exhaust. The check valve 54 prevents any loss of pressure in the pipe 56 and the cylinder 28. Upon the operation of the selector valve 48 the high pressure pump 32 is connected through the pilot pressure lines 102 and 100 to the valve 88 and through the pilot pressure line 98 to pilot 63 of the valve 62, thus opening the valve 62 to the flow of exhaust fluid from the cylinder 28 to the upper portion of the cylinder 76 of the governing means and opening the valve 88 to the flow of fluid from the lower portion of the cylinder 76 through the needle valve 90 to the sump. Low pressure fluid flowing from the pump 30 through the reduction valve 70 now acts on the piston 26 moving it downwardly under the control of the governing means, and fluid from the lower portion of the cylinder 76 flows into the sump at a rate dependent upon the setting of the needle valve 90 which thus determines the rate of downward movement of the piston 26 and consequently the rate of expansion of the charge in the mold cavity. The expansion of the charge terminates when the head 82 at the lower end of the piston rod 80 of the governing means engages the stop screw 84 which will have been adjusted to determine the degree of expansion of the charge in the mold cavity and the thickness of the resulting sole. The position of the piston 26 determined by the stop screw 84 is maintained during the latter part of the vulcanizing cycle.

At the termination of the vulcanizing cycle the chronometer 40 operates the valve 44 to connect the cylinder 28 to exhaust through the pipes 58 and 56, the by-pass line 118, the check valve 116 and the valve 44. Such operation of the valve 44 also causes the shifting of the selector valve 48 into its position in FIG. 3 thereby connecting the pilot pressure lines 98 and 100 to exhaust, thus causing the valve 62 to be closed by its spring to the flow of exhaust fluid from the cylinder 28 and causing the valve 88 to be closed to the flow of exhaust fluid from the pipe 86 through the needle valve 90 to the sump. Pressure fluid now flows through the pipe 96 and the check valve 94 to return the piston 78 to its elevated position.

Having thus described my invention, what I claim as new and desire to secure by Letters Patent of the United States is:

In a machine for molding outsoles onto shoe bottoms, mold elements providing a mold cavity, said elements including a bottom mold member movable heightwise of a shoe in the machine to apply pressure to a charge in the mold cavity, a piston for operating the bottom mold member, a fixed cylinder in which the piston operates, an exhaust line communicating with the cylinder, a normally closed shutoff valve in the exhaust line, a governor valve in the exhaust line on the downstream side of the shutoff valve, a source of low fluid pressure whereby the cylinder is pressurized during an initial stage of the machine cycle, a source of high fluid pressure whereby the cylinder is pressurized after said initial stage of the machine cycle, a control valve, a pressure line from the source of low fluid pressure to the control valve, a pressure line from the source of high fluid pressure to the control valve, a pressure line from the control valve to the cylinder, a chronometer which operates the control valve at the end of said initial stage of the machine cycle to close the source of low fluid pressure and to open the source of high fluid pressure, a selector valve interposed into the pressure line from the control valve to the cylinder, a first pilot operable only by pressure from said source of high fluid pressure to shift said selector valve thereby to divert the flow of pressure fluid away from the cylinder, a second pilot which receives the diverted flow of pressure fluid and is operated thereby to open said shutoff valve thus to open the exhaust line from the cylinder, and a gate valve manually operable to prevent the diversion of high fluid pressure to said first pilot thereby to cause fluid from said source of high fluid pressure to flow to the cylinder thereby to increase the pressure on the charge in the mold cavity.

References Cited in the file of this patent
UNITED STATES PATENTS

| | | |
|---|---|---|
| 1,655,815 | Johanson et al. | Jan. 10, 1928 |
| 1,885,337 | Dow | Nov. 1, 1932 |
| 2,358,353 | Stacy | Sept. 19, 1944 |
| 2,381,125 | Hermann | Aug. 7, 1945 |
| 2,647,281 | Capdevila | Aug. 4, 1953 |
| 2,763,897 | Gates et al. | Sept. 25, 1956 |